No. 882,924. PATENTED MAR. 24, 1908.
F. C. BOYNTON.
MILL STOCK MIXER AND DISTRIBUTER.
APPLICATION FILED APR. 11, 1907.
2 SHEETS—SHEET 1.
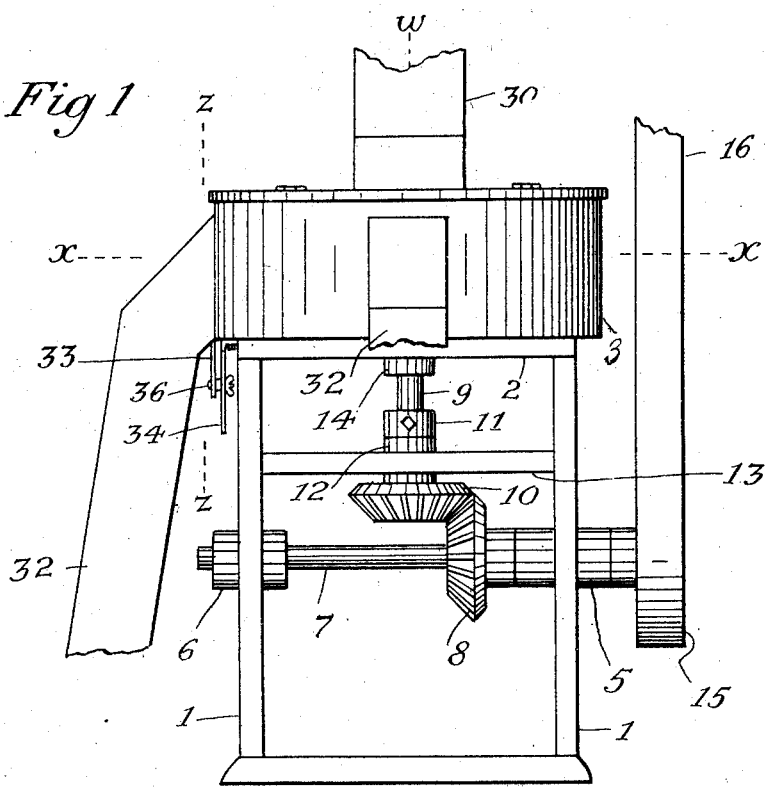
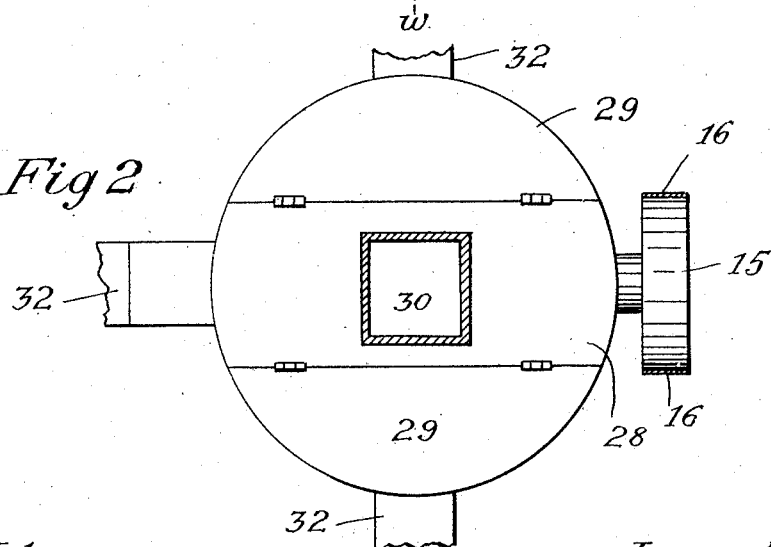
Witnesses:
Inventor;
Frederick C. Boynton.
By P. H. Gunckel
his Attorney

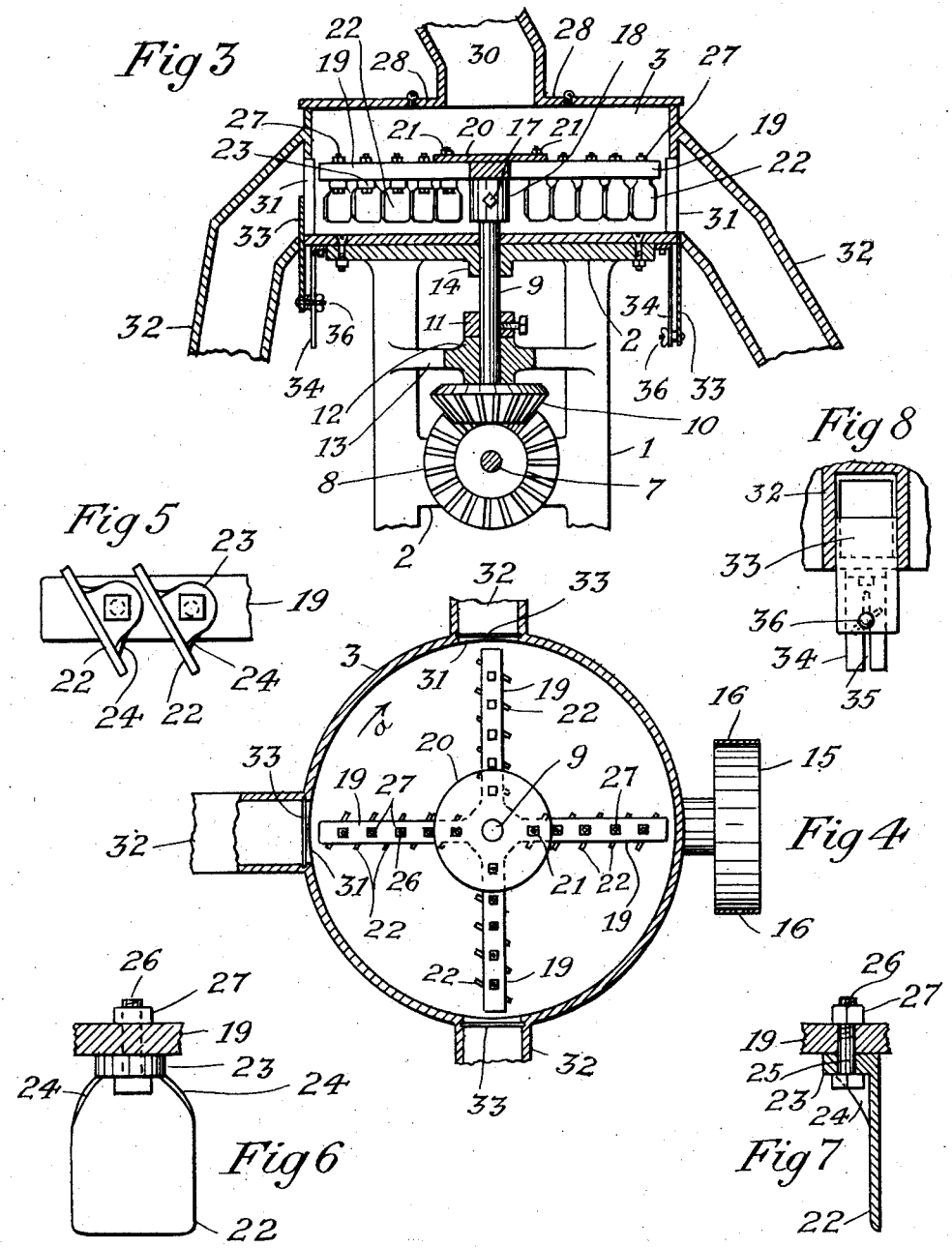

UNITED STATES PATENT OFFICE.

FREDERICK C. BOYNTON, OF MINNEAPOLIS, MINNESOTA.

MILL-STOCK MIXER AND DISTRIBUTER.

No. 882,924.        Specification of Letters Patent.        Patented March 24, 1908.

Application filed April 11, 1907. Serial No. 367,502.

*To all whom it may concern:*

Be it known that I, FREDERICK C. BOYNTON, a citizen of the United States, residing at Minneapolis, in the county of Hennepin and State of Minnesota, have invented certain new and useful Improvements in Mill-Stock Mixers and Distributers, of which the following is a specification.

My invention relates to devices for use in flour-mills for mixing and distributing or feeding stock to the various machines.

The object of my improvements is to produce an apparatus that is capable of thoroughly mixing material or stock of different kinds and discharging the mixtures uniformly and in desired quantities.

My improved apparatus comprises a cylindrical casing containing series of revolving mixers or flights in radial arrangement, and means for introducing material to the casing and for discharging it in regulated quantities. Such improvements are illustrated in the accompanying drawings, in which—

Figure 1 is a side elevation of my improved mixing and feeding apparatus; Fig. 2 is a plan view of the same; Fig. 3 is a vertical sectional view on the line *w—w* of Fig. 1; Fig. 4 is a horizontal sectional view on the line *x—x* of Fig. 1; Figs. 5, 6, and 7 are detail views of the spider arms and flights which operate to mix and discharge the material; and Fig. 8 is a sectional view on the line *z—z* of Fig. 1, showing the discharge-regulating device.

In the drawings 1 designates the legs and 2 the cross-pieces of the supporting frame of the machine. On the top of the frame is a short cylindrical casing 3 the bottom of which is secured to the frame by bolts 4. On the lower cross-pieces is mounted, in journal-boxes 5 and 6, a driving-shaft 7, carrying a miter-gear 8; and above it is supported a spindle or vertical shaft 9 having a miter-gear 10 in mesh with the gear 8. The spindle is supported by means of a collar 11 in contact with a boss 12 formed on a cross-piece 13 in which the spindle has a bearing; and the spindle also has a bearing at 14 in the upper frame cross-piece. Power is applied to a pulley 15 on the shaft 7 by means of a belt 16 for rotating the spindle.

To the head of the spindle 9 is secured by a bolt or set-screw 17 a hub 18 from which a plurality of arms 19 radiate to points near the walls of the casing. A disk 20 is attached centrally to said hub by bolts 21 passed through the arms 19. A series of flights or mixers 22 is attached to the under surface of each spider-arm 19, with their lower ends arranged on a plane a short distance above the bottom of the casing. The flights may consist of flat blades having their upper ends contracted and formed into rounded flanges 23 at right angles to the bodies of the blades; and tapering flanges 24 extend outward from the upper edges of the blades and terminate in the lateral flanges 23 for strengthening the flights. Holes 25 in the flanges 23 enable the flights to be connected by bolts 26 to the arms 19. The inclination of the blades to the axis of the arm can readily be adjusted and regulated as desired by loosening the nuts 27 on the bolts 26, turning the flights to the angle desired, and then tightening the nuts.

The top of the casing may consist of a fixed middle portion 28 and lids 29 hinged to its side edges, to provide convenient means for access to the interior. The feed-spout, or spouts, 30 for supplying material to the machine is preferably arranged to discharge at the center of the cover and onto the disk 20, so that the latter may serve to somewhat distribute the material to the flights. At the sides of the casing are openings 31, in any desired number, for the discharge of material, and discharge-spouts 32 are connected with the openings for conducting the material to the proper machines for further treating it.

For controlling and regulating the discharge of stock into a spout 32, an adjustable slide 33 is provided on the side of a plate 34 that depends from the frame 1 and has a vertical slot 35 through which the shank of a thumb-screw 36 passes loosely, so that the slide can be moved upward or downward as desired and clamped in place by operating the nut on the thumb-screw.

In use, the mill-stock—middlings of different degrees of fineness, or other material,—is fed into the casing through the spout or spouts 30 onto the revolving disk 20 which serves to spread it somewhat laterally, and it is then engaged by the flights which carry it along and agitate and thoroughly mix it in conducting it from a central position toward the casing walls. The angularity of the flights may readily be adjusted to the requirement of the stock to be operated upon so as to subject it to a greater or less degree of agitation in conducting it to the discharge openings. The amount of material to be conveyed by any one of the discharge spouts 32 is regulated by adjustment of the proper feed-regulating slide 33, so that the machine to which that spout conducts stock will receive the desired amount of feed.

Having described my invention, what I claim and desire to secure by Letters Patent is—

1. A mill stock mixer and distributer, comprising a casing forming a circular chamber having a plurality of outlets at its sides, means for introducing stock to the center thereof, a revolving spider therein having radial arms, a series of independently adjustable flights carried by said arms adapted to work the stock from the center to the circumference, discharge spouts connected with said outlets, and controllable valves for regulating the passage of stock through the outlets, substantially as set forth.

2. A mill stock mixer and distributer, comprising a casing forming a circular chamber having a plurality of outlets at its sides, means for introducing stock to the center thereof, a revolving spider therein having radial arms, a series of flights carried by said arms adapted to work the stock from the center to the circumference, discharge spouts connected with said outlets, and controllable valves for regulating the passage of stock through the outlets, substantially as set forth.

3. A mill stock mixer and distributer, comprising a casing forming a circular chamber, a rotating central spindle, radial arms revolved thereby, a series of flights on each of said arms, means for adjusting the inclination of the flights with respect to the arms, means for introducing material at or near the center and means for discharging it at or near the circumference of the chamber, said introducing and discharging means being connected to said casing, substantially as set forth.

In testimony whereof I have signed my name to this specification in the presence of two subscribing witnesses this 5″ day of April, 1907.

FREDERICK C. BOYNTON.

Witnesses:
P. H. GUNCKEL,
H. A. BOWMAN.